(12) United States Patent
Hussein (10) Patent No.: US 6,285,521 B1
(45) Date of Patent: Sep. 4, 2001

(54) DISK DRIVE EMPLOYING POWER SOURCE MODULATION FOR REDUCING POWER CONSUMPTION

(75) Inventor: Hakam D. Hussein, Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/276,255

(22) Filed: Mar. 25, 1999

(51) Int. Cl.[7] .................................................... G11B 15/46
(52) U.S. Cl. ...................................... 360/73.03; 360/77.08
(58) Field of Search ............................ 360/73.03, 73.01, 360/69, 77.02, 77.08, 61

(56) References Cited

U.S. PATENT DOCUMENTS

| 5,412,519 | 5/1995 | Buettner et al. . | |
|---|---|---|---|
| 5,706,265 | * 1/1998 | Bang | 360/73.03 X |
| 6,104,153 | * 8/2000 | Codilian et al. | 360/73.03 X |
| 6,104,566 | * 8/2000 | Stephenson | 360/73.03 |
| 6,215,609 | * 4/2001 | Yamashita et al. | 360/73.03 |

* cited by examiner

*Primary Examiner*—Andrew L. Sniezek
(74) *Attorney, Agent, or Firm*—Milad G Shara (57) ABSTRACT

A disk drive includes a disk having data tracks including servo sectors and data regions disposed between the servo sectors. A transducer head writes data to and reads data from the data regions and reads servo information from the servo sectors. A spindle motor rotates the disk. A spindle motor driver provides current to the spindle motor. A track-following controller is responsive to the servo information for causing the transducer head to remain on track. A microprocessor performs a power-saving idle operation of causing the spindle motor driver to sequentially (1) provide no current to the spindle motor for at least one disk revolution and (2) provide current to the spindle motor for at least one disk revolution. The power-saving idle operation is performed while the track-following controller causes the transducer head to remain on track for multiple disk revolutions. The power-saving idle operation is typically performed during an idle state of the disk drive to reduce power consumed by the disk drive while permitting fast recovery from the idle state to read and write operations.

25 Claims, 8 Drawing Sheets

DISK DRIVE EMPLOYING POWER SOURCE MODULATION FOR REDUCING POWER CONSUMPTION

BACKGROUND OF THE INVENTION

1. Field of the Invention

The present invention generally relates to reducing power consumed by disk drives. More particularly, the present invention relates to disk drives employing power source modulation for reducing power consumption, such as when the disk drive is idling.

2. Description of the Prior Art

In hard disk drives, data is stored on magnetic media disks in concentric data tracks, which are divided into groups of data sectors. Disks are typically stacked on a spindle assembly. The spindle assembly is mechanically coupled to a spindle motor which rotates the disks at a substantially constant operating spin-rate. A spindle motor driver typically includes power metal oxide semiconductor field effect transistors (MOSFETs) to drive the spindle motor. A microprocessor is typically employed to ascertain when to apply a run signal, a coast signal, or a brake signal to the spindle motor driver to control the operation of the spindle motor.

The torque developed ($T_d$) by the spindle motor is given by the following Equation I:

$$T_d = Kt * I_m \qquad \text{Equation I}$$

Where:

Kt is the torque constant of spindle motor;

$I_m$ is spindle motor current;

Power dissipation in the windings of the spindle motor are given by the following Equation II:

$$P = I_m^2 * R_m \qquad \text{Equation II}$$

where:

$R_m$ is the total resistance of the spindle motor and wire connections between the spindle motor and the power MOSFETs.

Power dissipation in the power MOSFETs are given by the following Equation III:

$$P = I_m^2 * R_{fet} \qquad \text{Equation III}$$

where:

$R_{fet}$ is the resistance in the power MOSFETs that are turned on for controlling current Im flowing through the spindle motor.

It is known to increase the RPM of the spindle motor to reduce rotational latency and increase disk transfer rate in the disk drive. However, as disk drives employ spindle motors operating at higher RPMs (such as 10,000 RPMs and higher), it is necessary to offset increased drag torque opposing the developed torque $T_d$ in order to maintain the spindle motor at a substantially constant operating spin-rate. As can be shown by Equations I–III above, an increased developed torque $T_d$ required to off-set the increased drag torque to maintain the higher operating spin-rate of the spindle motor can be obtained by increasing the spindle motor current $I_m$. Unfortunately, increasing the spindle motor current $I_m$ causes a corresponding heating of the windings of the spindle motor as shown by the above power dissipation Equation II and also a corresponding heating of the power MOSFETs used to drive the spindle motor as shown by the above Equation M. The additional heat generated by the disk drive can cause heat related breakdown of components in the disk drive, including the spindle motor windings and the power MOSFETs themselves.

In addition, power supplies in high performance computer systems which employ disk drives having spindle motors operating at high RPMs typically limit the average current output from the computer system's power supply circuitry to reduce the cost of the computer system. An increased spindle motor current $I_m$ necessary to maintain the higher operating spin-rate may cause an average spindle motor current to exceed the average current output from the computer system's power supply.

It is known to employ a power saving operation to reduce power consumption when the disk drive is idling during an idle period (i.e., no read or write operations are being performed). A power saving operation may include parking the head and spinning-down the disk drive to a stop during the idle period. U.S. Pat. No. 5,412,519 (the "Buettner patent") discloses a power saving operation that spins down the spindle motor to the minimum rotational velocity that is required for the head to continue flying above the disk during the idle period. A disadvantage with such power saving operations is that there is a significant recovery time to resume read and write operations after the idle period.

For reasons stated above, there is a need to reduce power consumption in the spindle motor and its power MOSFETs, especially in high performance disk drives operating at 10,000 RPMs and higher. In addition, there is a need to reduce the power consumption in the spindle motor and its power MOSFETs without significantly increasing the recovery time to resume read and write operations after an idle period.

SUMMARY OF THE INVENTION

The invention can be regarded as a disk drive comprising a disk including a recording surface having a plurality of data tracks. Each data track has servo sectors and data regions disposed between the servo sectors. The servo sectors include servo information. The disk drive includes transducer means for writing and reading from the data regions and reading servo information from the servo sectors. The disk drive further includes a spindle motor and a spindle motor driver. The spindle motor is coupled to the disk to rotate the disk. The spindle motor driver selectively provides current to the spindle motor. The disk drive includes track-following control means responsive to the servo information for causing the transducer means to remain on track. The disk drive further includes programmable means for performing a power-saving idle operation of causing the spindle motor driver to sequentially (1) provide no current to the spindle motor for at least one disk revolution and (2) provide current to the spindle motor for at least one disk revolution. The power-saving idle operation is performed while the track-following control means causes the transducer means to remain on track for multiple disk revolutions.

The invention can also be regarded as a method of operating a disk drive comprising a disk including a recording surface having a plurality of data tracks. Each data track has servo sectors and data regions disposed between the servo sectors. The servo sectors include servo information. The disk drive includes transducer means for writing and reading from the data regions and reading servo information from the servo sectors. The disk drive includes a spindle motor coupled to the disk to rotate the disk, and a spindle motor driver for selectively providing current to the spindle motor. The method includes the step of maintaining the transducer means on track for multiple disk revolutions. While performing the step of maintaining the transducer means on track, the method includes sequentially (1) providing no current to the spindle motor for at least one disk revolution and (2) providing current to the spindle motor for at least one disk revolution.

The invention can also be regarded as a disk drive comprising a disk including a recording surface having a plurality of data tracks. Each data track has servo sectors and data regions disposed between the servo sectors. The servo sectors include servo information. The disk drive includes transducer means for writing and reading from the data regions and reading servo information from the servo sectors. The disk drive further includes a spindle motor having a plurality of windings. The spindle motor is coupled to the disk to rotate the disk. The disk drive includes a spindle motor driver having switching elements coupled to the plurality of windings for selectively providing current to the spindle motor. The disk drive includes track-following control means being responsive to the servo information for causing the transducer means to remain on track. The disk drive further includes programmable means for performing a power-saving idle operation of causing the spindle motor driver to sequentially (1) turn off all of the switching elements so that no current is provided to the spindle motor and (2) turn on selected ones of the switching elements to provide current to the spindle motor. The power-saving idle operation is performed while the track-following control means causes the transducer means to remain on track for multiple disk revolutions.

DESCRIPTION OF THE PREFERRED EMBODIMENTS

Figure 1:
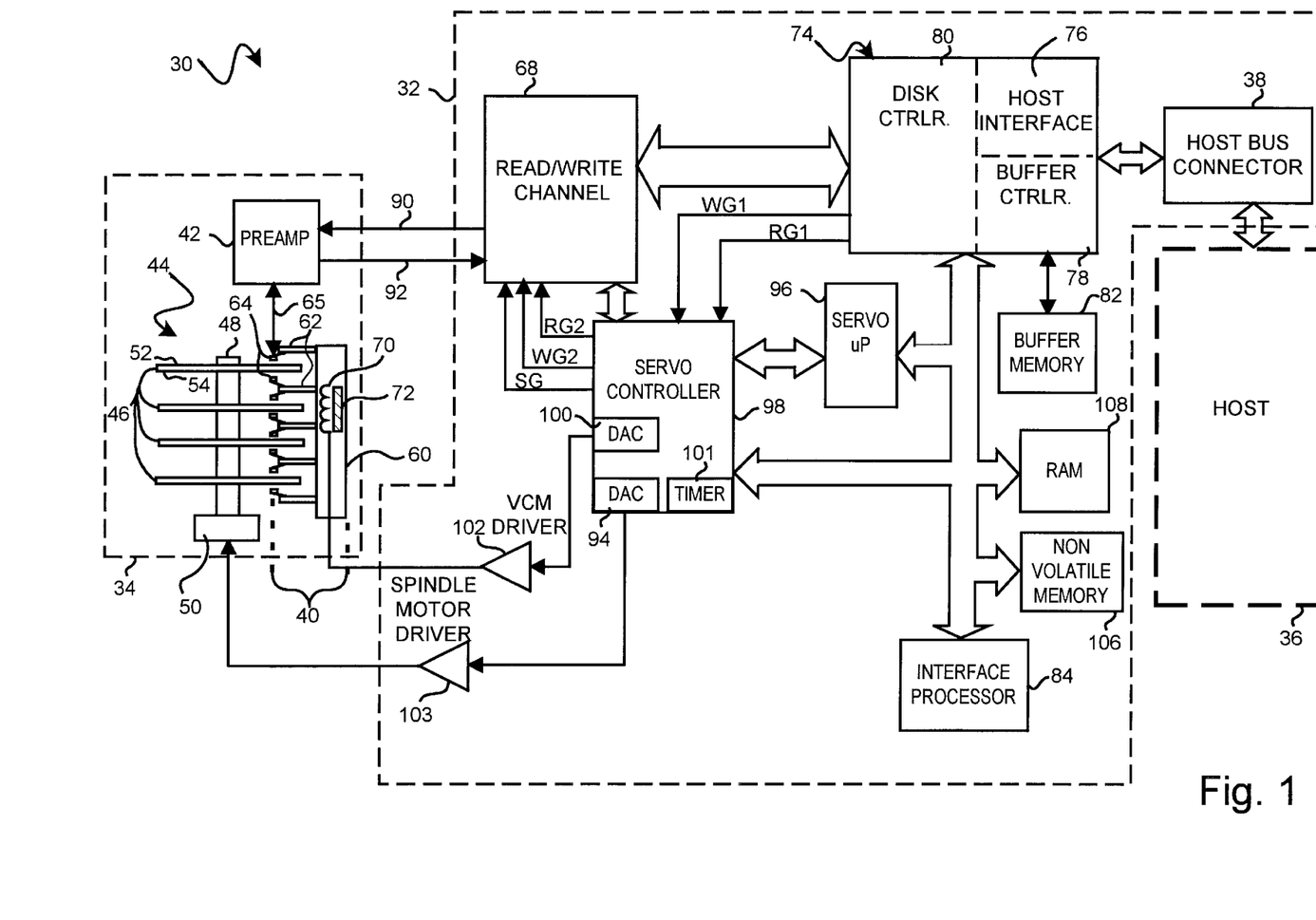
FIG. 1 is a block diagram of a hard disk drive embodying the present invention.

A hard disk drive according to the present invention is illustrated generally at 30 in FIG. 1. Disk drive 30 includes a disk control system 32 and a head disk assembly (HDA) 34. Disk control system 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes a plurality of magnetic media disks, such as indicated at 46. Disks 46 are stacked on a spindle assembly 48. Spindle assembly 48 is mechanically coupled to a spindle motor 50 for rotating disks 46 at a high spin-rate. Each disk 46 includes two disk recording surfaces (i.e., disk surfaces) capable of storing data thereon, such as indicated at 52 and 54.

Actuator assembly 40 includes a voice coil motor (VCM) 60 and multiple actuator arms 62 extending from VCM 60. Each actuator arm 62 corresponds to a respective disk surface, such as disk surface 52 and 54. A transducer head 64 is disposed at the end of each actuator arm 62 and each transducer head 64 is associated with a corresponding disk surface 52, 54. Transducer heads 64 communicate with disk control system 32 via preamplifier 42 for reading and writing data to the associated disk surface 52, 54. Preamplifier 42 is electrically coupled to transducer head 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs encoding and decoding of data written to and read from the disks 46.

VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HIDC) 74 having a host interface 76, a buffer controller 78 and a disk controller 80. Host interface 76 communicates with host system 36 via host bus connector 38 by receiving commands and data from and transmitting status and data back to host system 36. Buffer controller 78 controls a buffer memory 82 employed for storing data from host system 36 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 90 and write lines 92. During a read operation, preamplifier 42 amplifies the transition pulses that are detected by a transducer head 64 associated with a disk surface and amplifies them to a signal level that can be processed by read/write channel 68. Read/write channel 68 receives the magnetic transition pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 92 and preamplifier 42. Preamplifier 42 generates current to drive the transducer head to write transitions on the disk surface.

A servo microprocessor 96 commands a servo controller 98 to control the position of transducer head 64 over disk 46 at a target data track for subsequent execution of read or write commands. Servo microprocessor 96 receives a representative form of a position error signal sensed by transducer head 64, via preamplifier 42 and read/write channel 68 and performs calculations to position transducer head 64 relative to its associated disk surface. A digital signal-to-analog converter (DAC) 100 in servo controller 98 responds to digital commands from servo microprocessor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks.

Servo microprocessor 96 also provides commands to servo controller 98 to control the rotational velocity of spindle motor 50. Servo microprocessor 96 controls the rotational velocity of spindle motor 50 via servo controller 98 and a spindle motor driver 103 to maintain a substantially constant operational rotational velocity of rotating disks 46. Spindle motor 50 and the operation of servo microprocessor 96, servo controller 98, and spindle motor driver 103 for controlling spindle motor 50 are described in detail further in this specification.

Disk control system 32 further includes read gate RG1 and write gate WG1 electrically coupled between disk controller 80 and servo controller 98. Read gate RG2 and write gate WG2 are electrically coupled between servo controller 98 and read/write channel 68. Read gates RG1 and RG2 must be asserted for reading of data from a disk surface through read/write channel 68. Similarly, write gates WG1 and WG2 must be asserted before writing of data occurs on a disk surface through read/write channel 68. Servo gate signal SG is enabled when reading servo data from a servo sector located on a disk surface. Also, read gate RG1 or write gate WG1 may be asserted, but servo controller 98 may prohibit the reading or writing of data. For example, when writing data to a disk surface, interface processor 84 may command disk controller 80 to write multiple blocks of data to a data region or series of data sectors on a disk surface, but servo controller 98 may prohibit writing by not enabling write gate WG2 if the transducer head is not on track with the desired target track.

Disk drive control system (including servo system) operational programs are stored in non-volatile memory 106, which may be read-only memory (ROM) or flash memory, and can be all or partially loaded into RAM 108 for execution from RAM 108 or both RAM 108 and non-volatile memory 106. Alternatively, portions of disk system operational programs are stored on reserve cylinders on disks 46. Upon startup of hard disk drive 30, disk drive programs, such as the servo system operational programs, are transferred into RAM 108 for fast access by servo microprocessor 96 for positioning transducer head 64 for execution of read and write commands.

In an exemplary operation of disk drive 30, servo microprocessor 96 receives a command to position actuator assembly 40 for accessing data or writing data on a specific target data track on a disk surface 52 or 54. In operation of disk drive 30, disk controller 80 keeps track of where transducer head 64 is circumferentially located over disk 46, and servo microprocessor 96 keeps track of which circular data track or "cylinder" of data tracks the transducer head is over, and maintains timing and keeps the transducer head tracking or following on the desired target data track.

The current circular data track position of transducer head 64 is stored in RAM 108 to permit servo microprocessor 96 to determine a required seek distance between the current data track and a target data track on disk 46. Based on the required seek distance, servo microprocessor 96 retrieves a corresponding read or write seek profile from RAM 108 and provides a digital signal command to DAC 100 corresponding to the seek profile. DAC 100 provides a corresponding analog signal to VCM driver 102 representative of the seek profiles. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position error signal is provided via preamplifier 42, read/write channel 68, and servo controller 98 to servo microprocessor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

Spindle Motor Operation

Figure 2A:
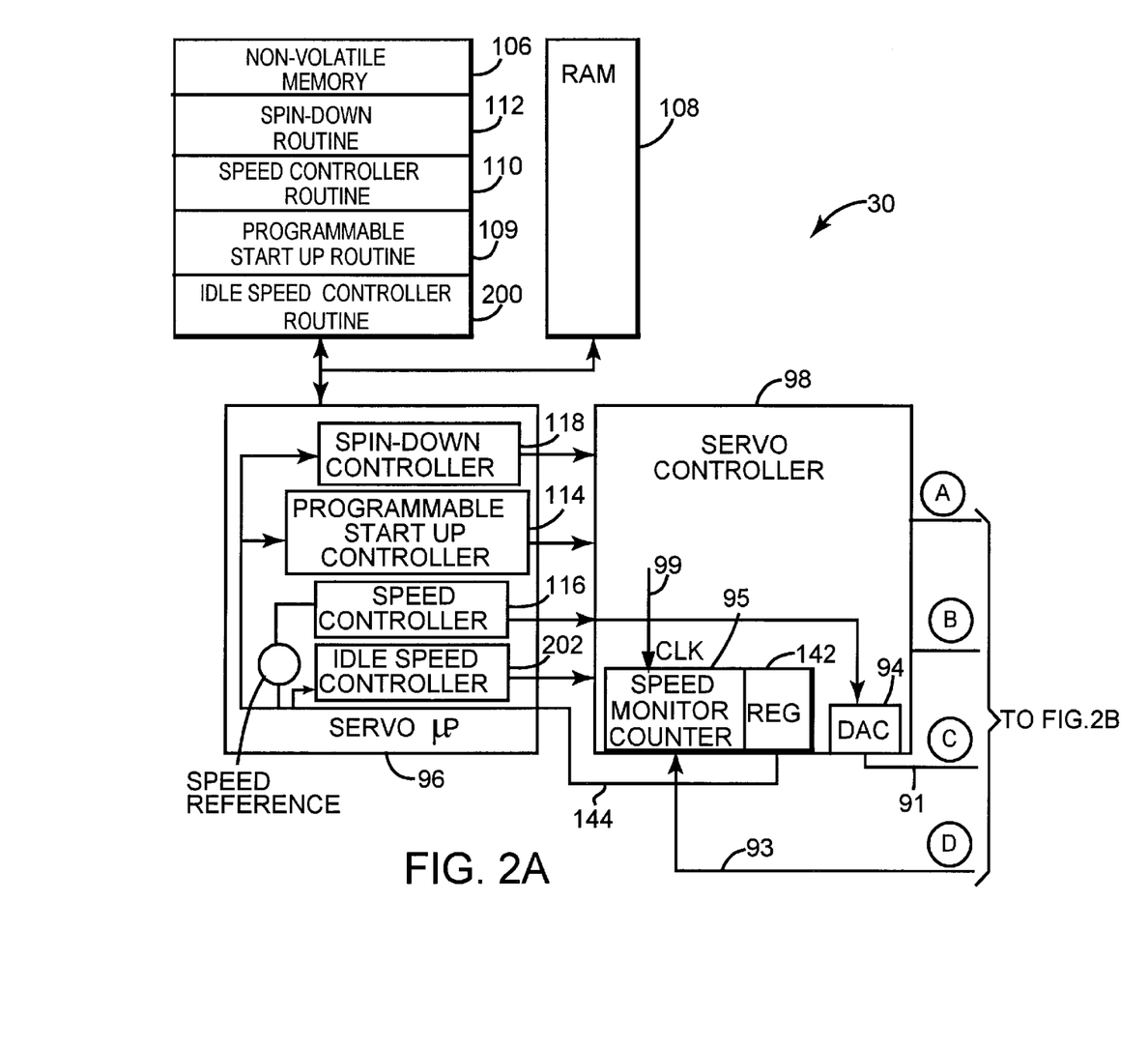
FIGS. 2A–B together form a more detailed schematic block diagram of a portion of the hard disk drive of FIG. 1
Figure 2B:
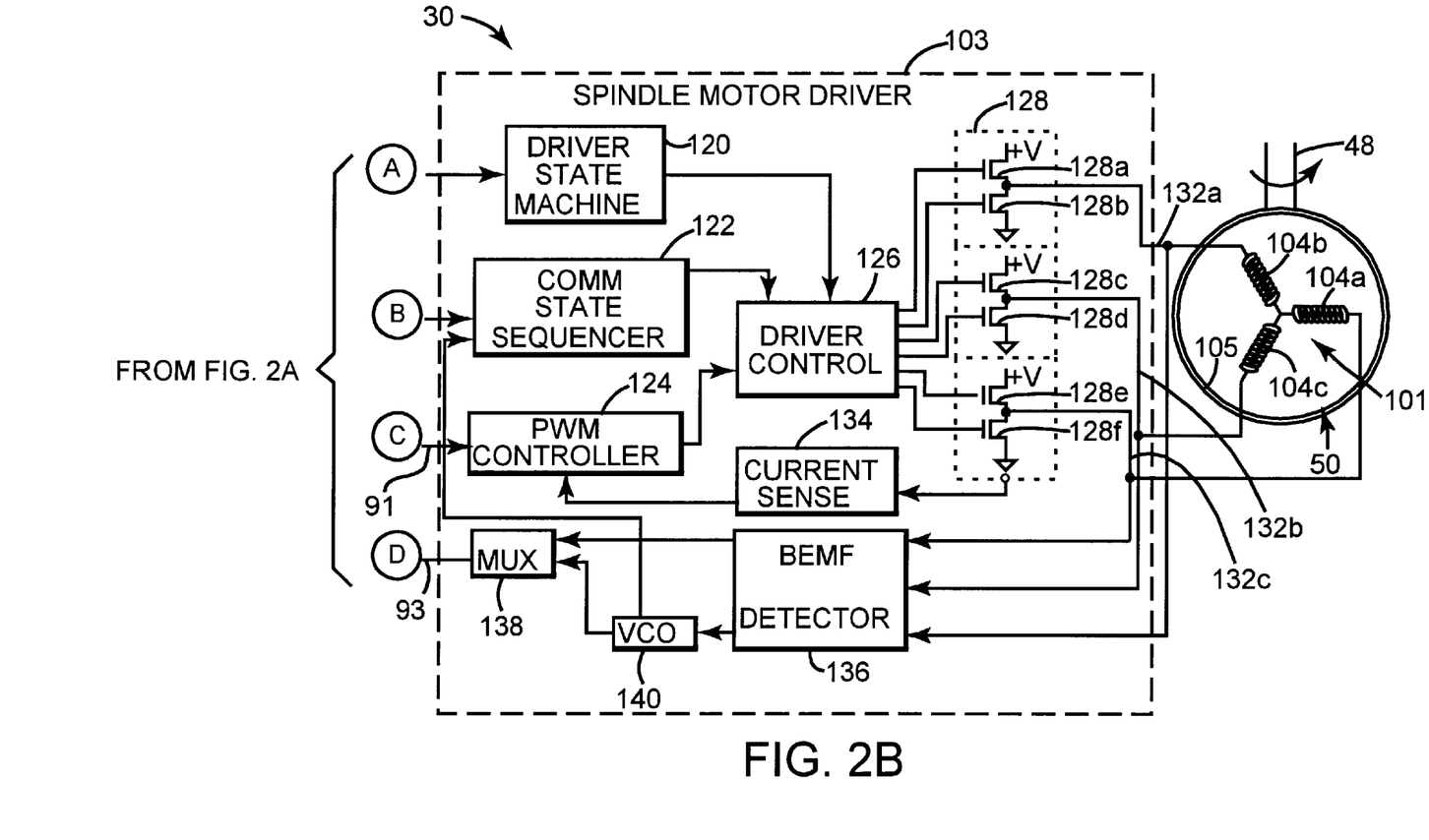

FIGS. 2A–B illustrate certain portions of disk drive 30 relevant to an embodiment of the present invention in more detail in schematic and block diagram form. The embodiment of spindle motor 50 illustrated in FIGS. 2A–B includes a stator 101 having three windings 104a, 104b, and 104c electrically arranged in a Y configuration, and a rotor 105. In one exemplary embodiment, spindle motor 50 is implemented in an eight pole, three-phase DC brushless motor.

Rotor 105 has magnets that provide a permanent magnetic field. Spindle motor 50 generates torque ($T_d$) on rotor 105 when current ($I_m$) flows through at least one of windings 104. $T_d$ depends upon the magnitude and direction of current flow through the windings 104, and the angular position of rotor 105 relative to stator 101. The functional relationship between torque and current flow and angular position is commonly depicted in a set of torque curves, each of which corresponds to a respective one of a set of commutation states.

Various firmware routines are stored in memory locations in non-volatile memory 106 for controlling the operation of spindle motor 50. For example, a programmable startup routine 109, a speed controller routine 110, and a spin-down routine 112 are stored in non-volatile memory 106 for controlling spindle motor 50 during start-up, running, and spin-down of spindle motor 50. Servo microprocessor 96 preferably comprises a digital signal processor that runs routines 109, 110, and 112 to control spindle motor 50.

During a start-up operation of spindle motor 50, servo microprocessor 96 responds to a startup command to receive and execute programmable startup instructions from programmable start-up routine 109 of non-volatile memory 106 to form a programmable start-up controller 114 within servo microprocessor 96.

Similarly, during a run operation of spindle motor 50, servo microprocessor 96 receives and executes speed controller instructions from speed controller routine 110 of non-volatile memory 106 to form a speed controller 116 within servo microprocessor 96.

During a spin-down operation of spindle motor 50, servo microprocessor 96 responds to a spin-down command to receive and execute spin-down instructions from spin-down routine 112 to form a spin-down controller 118 within servo microprocessor 96. Servo microprocessor 96 provides spindle motor control signals to servo controller 98 which are generated by programmable start-up controller 114 during start-up operations, by speed controller 116 during run operations, and by spin-down controller 118 during spin-down operations. Example spindle motor control signals include a run signal for controlling the running of spindle motor 50, a coast signal to trigger spindle motor 50 to coast, and a brake signal which triggers spindle motor 50 to brake.

Servo controller 98 interprets the spindle motor control signals and provides a representative form of the control signals to a driver state machine 120. Suitably, driver state machine 120 can be in one of four distinct logical states at a given time. The logical states include a run state, a coast state, a brake state, and a preset state for transitioning between the brake state and the coast state.

During the run state, a commutation state sequencer 122 sequences through a set of six commutation states corresponding to a set of torque curves to control switching elements 128 which drives spindle motor 50 via a driver control 126 to maximize the peak positive torque produced by spindle motor 50.

During the run state, speed controller 116 within servo microprocessor 96 provides commands to a DAC 94 in servo controller 98. DAC 94 responds to the commands from servo microprocessor 96 to provide an analog signal on a line 91 to a PWM controller 124 in spindle motor driver 103. PWM controller 124 provides a PWM control signal to power driver control circuit 126 for controlling current flowing through windings 104*a*, 104*b*, 104*c*. Power driver control circuit 126 has six lines which are each coupled to a gate of a corresponding one of power metal oxide semiconductor field effect transistors (MOSFET) 128*a*, 128*b*, 128*c*, 128*d*, 128*e*, and 128*f*.

Power MOSFETs 128*a*–*f* form switching elements 128. Suitably, in an embodiment where all power MOSFETs 128*a*–*f* are implemented as N-channel MOSFETs, the drain of power MOSFET 128*a* is coupled to the positive power supply and its source is coupled to winding 104*b* via a line 132*a*. Power MOSFET 128*a* is paired with power MOSFET 128*b*, which has its source coupled to ground and its drain coupled to winding 104*b* via line 132*a*. Similarly, power MOSFET 128*c* has its drain coupled to the positive power supply and its source coupled to winding 104*c* via a line 132*b*, and is paired with power MOSFET 128*d* which has its source coupled to ground and its drain coupled to winding 104*c* via a line 132*a*. Power MOSFET 128*e* has its drain coupled to the positive power supply and its source coupled to winding 104*a* via a line 132*c*, and is paired with power MOSFET 128*f* which has its source coupled to ground and its drain coupled to winding 104*a* via line 132*c*.

Each power MOSFET pair (i.e., 128*a*–128*b*, 128*c*–128*d*, and 128*e*–128*f*) preferably forms a switching element. Each switching element 128 includes a pair of MOSFETs which are in one of three possible states as follows: 1) the upper MOSFET (e.g., 128*a*) is on and the lower MOSFET (e.g., 128*b*) is off to switch the +V voltage to the corresponding winding 104 connected to the switching element; 2) the upper MOSFET (e.g., 128*a*) is off and the lower MOSFET (e.g., 128*b*) is on to couple the corresponding winding 104 to ground; and the tri-state condition where the upper MOSFET (e.g., 128*a*) and the lower MOSFET (e.g., 128*b*) are both off, such that the terminal of the winding 104 connected to the switching element floats and no current flows through that winding. If either of the pair of MOSFETs in switching element 128 is conducting, the switching element is referred to as a driven switching element and the winding 104 connected to the driven switching element is referred to as a driven winding. If neither MOSFET in switching element 128 is conducting, the switching element is referred to as a tri-stated switching element or undriven switching element and the winding 104 connected to the tri-stated switching element is a floating winding.

Suitably, commutation state sequencer 122 via driver control 126 switches on two power MOSFETs 128 on opposite legs of windings 104 during each of the commutation run states, such as power MOSFET 128*a* and 128*d*. In this example, power MOSFET 128*e* and 128*f* are shut off so that no current flows through winding 104*a*, resulting in a floating winding. Thus, there is one floating winding for three-phase spindle motor 50 during each of the six commutation run states.

Current sense circuit 134 senses current flow through the switched on power MOSFETs 128 and provides a feedback signal to PWM controller 124 for controlling the current flowing through the switched on MOSFETs 128. During the example run operation where two power MOSFETs 128 on opposite legs of windings 104 are switched on during each of the commutation run states, PWM controller 124 controls the current flowing through the switched on power MOSFETs 128. If current sense circuit 134 indicates too much current flowing through the switched on power MOSFETs 128, PWM controller 124 overrides commutation state sequencer 122 to shut power MOSFETs 128 off until the current is at a more appropriate level.

A Bemf detector 136 monitors a Bemf of spindle motor 50 and provides a Bemf zero crossing signal to a multiplexer 138 and a voltage controlled oscillator (VC0) 140. During coasting operations, Bemf detector 136 monitors Bemf from at least one of the windings 104 and provides the Bemf zero crossing signal, which is substantially noise free during coasting operations, to a first input of multiplexer 138 which is selected to be provided to servo controller 98 on a line 93 as a Bemf zero crossing signal representative of the bemf of spindle motor 50. During run operations, Bemf detector 136 monitors the Bemf from the floating phase winding 104 and provides a somewhat noisy Bemf zero crossing signal to VC0 140. During the run phase, VCO 140 rejects high frequency noise from the Bemf zero crossing signal and provides this filtered signal to a second input of multiplexor 138 which is selected to be provided as the Bemf zero crossing signal on line 93 to servo controller 98.

A speed monitor counter 95 in servo controller 98 detects zero crossings in the Bemf signal on line 93. The detected zero crossings in the Bemf signal on line 93 are used by speed monitor counter 95 to determine one revolution of spindle motor 50. For example, in an eight pole, three-phase spindle motor 50, there are 24 zero crossings included in one revolution of the spindle motor. Speed monitor counter 95 counts a number of clock periods of a fixed clock signal on line 99 occurring in one revolution of spindle motor 50. This number of clock periods of the fixed clock signal on line 99 represents the spin-rate of spindle motor 50 and is stored in a register 142 in speed monitor counter 95. Register 142 is updated once per revolution and the spin-rate value stored in register 142 is provided as a speed-indicating signal on a line 144 to servo microprocessor 96.

In the run operation, servo microprocessor 96 serves as speed controller 116 to execute speed controller routine 110 out of non-volatile memory 106 and RAM 108. Servo microprocessor 96 functioning as speed controller 116 reads the speed-indicating signal on line 144 and uses the spin-rate value represented in the speed-indicating signal for controlling the spin-rate of spindle motor 50 via servo controller 98 to maintain a substantially constant spin-rate of disk 50. A speed reference is used by speed controller 116 to provide a digital signal to DAC 94 in servo controller 98, which provides the analog signal on line 91 to PWM controller 124 which controls the current flowing through the switched on power MOSFETs 128 during run operations based on the difference between the speed reference and the value of the speed-indicating signal on line 144. Commutation state sequencer 122 operates during start-up and run operations by sequencing through commutation states to control which of power MOSFETs 128 are switched on and which are switched off so that peak positive torque will be generated for rotor 105 of spindle motor 50.

During a coast operation of disk drive 30, all of the power MOSFETs 128 are off so that the windings 104 of spindle motor 50 are floating and no current flows through windings 104 and substantially only frictional forces slow down spindle motor 50. During a dynamic braking operation of disk drive 30, the power MOSFETs 128 are turned on in such a way to short windings 104 of spindle motor 50. With windings 104 shorted, there is no source voltage, therefore, a negative current and reverse braking torque are developed resulting from the Bemf of spindle motor 50.

Disk Surface and Servo Sector Configuration

Figure 3:
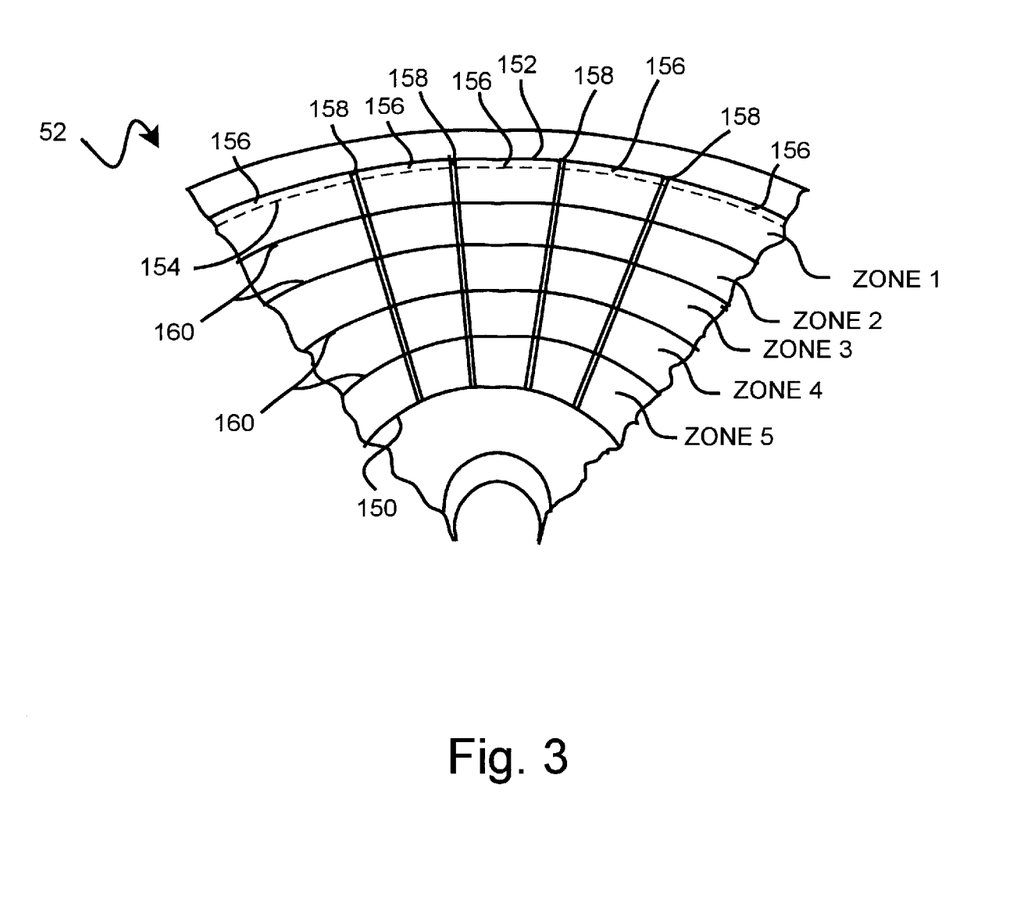
FIG. 3 is a partial plan view of a disk surface in the disk drive of FIG. 1, the disk surface including a plurality of data tracks having data regions and embedded servo sectors.

FIG. 3 is a partial plan view illustrating a disk surface 52. Disk surface 52 includes an inner boundary 150 and an outer boundary 152. Data is stored on a concentric, circular data tracks indicated by representative line 154, between inner boundary 150 and outer boundary 152. Recorded information (i.e., user data) on the disk surface is divided into data regions indicated at 156. Data regions 156 can contain data sectors, groups of data sectors or partial data sectors. Embedded information is recorded in servo sectors or servo "wedges", indicated at 158 placed in radially continuous narrow regions between data regions 156. Servo sectors 158 include servo information in a number of fields.

In the embodiment of disk surface 52 illustrated in FIG. 3, disk surface 52 has five physical recording zones labeled Zone 1, Zone 2, Zone 3, Zone 4, and Zone 5 which are separated by partitions 160. Disk surface 52 may be partitioned into any desirable, usable number of zones, which more typically ranges between 10 to 16 zones. The recording zones are used to assign groups of adjacent data tracks to a plurality of zones between inner boundary 150 and outer boundary 152. The establishment of recording zones permits efficient recording of data by varying recording frequencies to maintain approximately constant linear bit density across the disk and is well known in the art.

Figure 4:
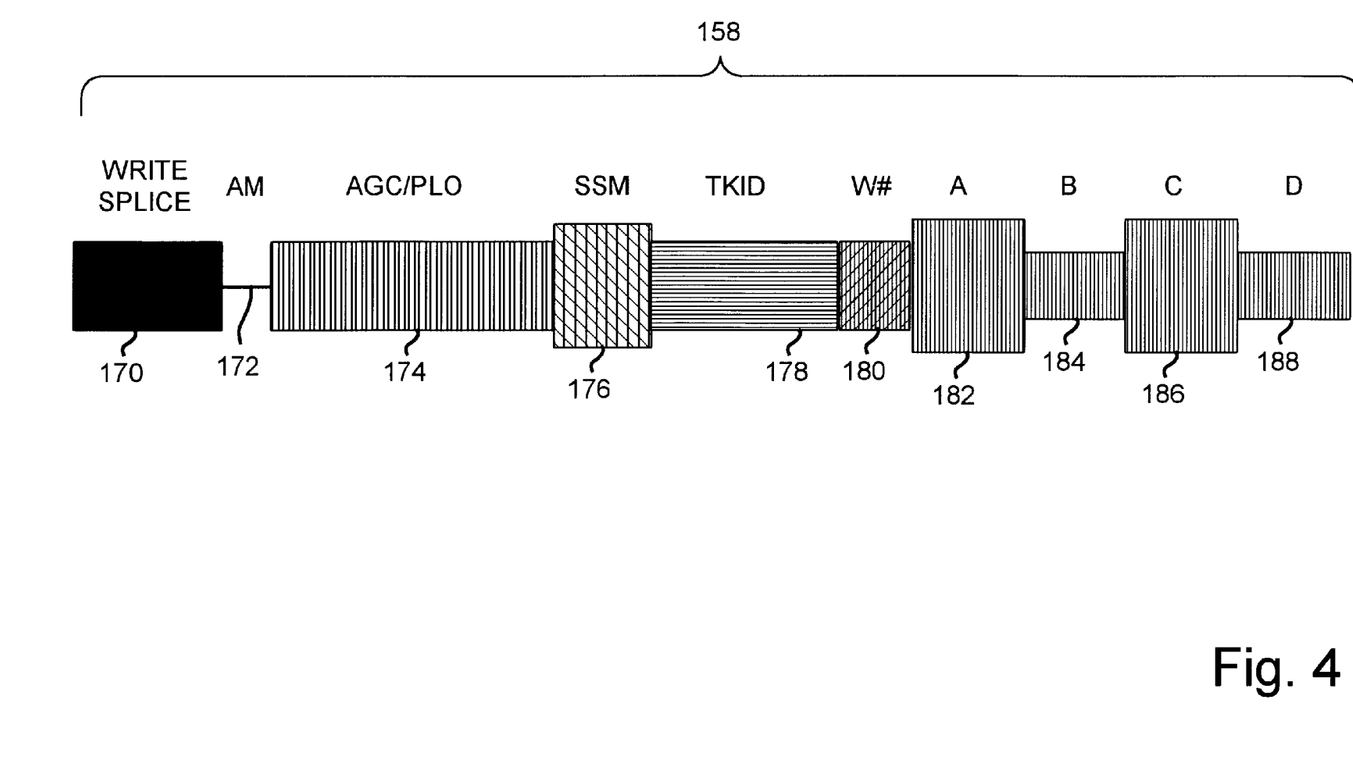
FIG. 4 is a diagram illustrating example fields of an embedded servo sector of FIG. 3.

FIG. 4 illustrates example servo information fields of an example servo sector 158. The servo information fields of servo sector 158 provide information for performing various functions related to reading servo data in the servo sector. A write splice or set-up field 170 provides a buffer zone following a proceeding data region 156 to prevent an erasure in the data region being erroneously detected as an address mark. An address mark (AM) field 172 provides a uniquely modulated segment which permits detection of a servo sector 158. Typically AM field 172 is created by a dc erase of the segment. An automatic gain control (AGC) and phase lock oscillator (PLO) field 174 provides a stable reference to set the gain of read/write channel 68 and "train" a phase lock oscillator to lock on the servo channel frequency. A servo sync mark (SSM) field 176 provides a uniquely coded word which when detected by servo controller 98 within a servo detection window, causes servo controller 98 to set a timing interval within a servo timer 101 in servo controller 98 to enable a new detection window for detecting the SSM field 176 within the next servo sector 158. If a SSM field 176 is not detected within the servo detection window, a servo sync mark time-out signal is generated, such as by setting a bit in a register in server controller 98.

A track identification field (TKID) 178 provides a coded binary address of the current data track 154. A W# field 180 identifies a sequence number of each servo sector in the sequence of servo sectors spaced around data track 154. For example, a data track 154 may include 60 equally spaced servo sectors 158 with data regions 156 located between adjacent servo sectors 158. Servo burst fields A–D indicated at 182, 184, 186, and 188 are employed in a conventional matter to provide fine position error information during track-following operations. Essentially, as transducer head 64 passes over servo bursts 182–188, the transducer head provides a position error signal indicating off track position relative to a center line of a desired data track 154. The detection of the SMM field 176 within the servo detection window also causes servo controller 98 to provide timing windows over appropriate ones of servo bursts 182–188 to demodulate the position error signal. The off-track position error signal indicates, in a known manner, both magnitude and direction of outwards or inwards off-track position of transducer head 64.

Reading the Servo Sector

There are typically two modes of operation employed by the servo circuitry of disk drive 30 (i.e., read/write channel 68, servo controller 98, and servo microprocessor 96) to read the servo information fields of servo sector 158, which are referred to as "soft sector" mode and "hard sector" mode. In the soft sector mode, read/write channel 68 searches for the unique AM field 172. When an AM field 172 is detected, servo controller 98 activates a servo gate (SG) signal to read/write channel 68 to activate servo detection circuitry in read/write channel 68 for the processing of the remaining fields in the servo sector 158. Preferably, when the SSM field 176 is detected, the hard sector mode is entered. In the hard sector mode, a precisely timed sampling of servo sector 158 is implemented by setting servo timer 101 in servo controller 98 to an interval which is calibrated for the particular zone or band of data tracks 154 being accessed. Servo timer 101 is reset at each SSM field 176 detection and re-initialized to the appropriate time interval. In this way, each servo sector 158 is read at a predetermined time interval. The hard sector mode is preferred over the soft sector mode because it is more precise and reliable, as is known in the art. Therefore, soft sector mode is generally reserved for situations where the servo detection window for reading the next servo sector 158 is unknown.

The reading of servo information in servo sector 158 depends on achieving PLO synchronization by reading the AGC/PLO field 174 for synchronizing a clock in the servo circuitry to the incoming servo sector data. The SSM field 176 serves as a sector timer mark to verify receipt of a servo sector 158, establish bit synchronization, and to establish the timing between sequential servo sectors 158. The locking to the PLO field 174 and the detection of the SSM field 176 is dependent on the spin-rate of spindle motor 50.

Power Source Modulation to Spindle Motor During Idle Operation

As illustrated in FIG. 2A, a firmware routine referred to as idle speed controller routine 200 is preferably stored in memory locations in non-volatile memory 106 for controlling the operation of spindle motor 50 during an idle mode when disk drive 30 is not performing read or write operations. Servo microprocessor 96 comprises a digital signal processor that executes idle speed controller routine 200 to control spindle motor 50 during the idle mode. The idle mode of disk drive 30 is detected by interface processor 84 when no read or write commands are received from host 36 for a predetermined time interval. Interface processor 84 sends the idle mode detection to servo microprocessor 96. Servo microprocessor 96 responds to the idle mode detection by interface processor 84 to receive and execute idle speed controller instructions from idle speed controller routine 200 to form an idle speed controller 202 within microprocessor 96. Servo microprocessor 96 provides spindle motor control commands to servo controller 98 which are generated by programmable idle speed controller 202 during the idle mode.

During the idle mode, servo microprocessor 96 cyclically provides a coast command to servo controller 98 to trigger spindle motor 50 to coast, and an accelerate (i.e. run) command to servo controller 98 to control running of spindle motor 50. Idle speed controller 202 performs this cyclical operation of causing spindle motor 50 to coast and accelerate as a power source modulation operation to reduce the power consumption of disk drive 30 during the idle mode. Servo controller 98 and spindle motor driver 103 respond to run commands (i.e. accelerate commands), coast commands, and brake commands as described above with reference to FIGS. 2A and 2B.

Figure 5A:
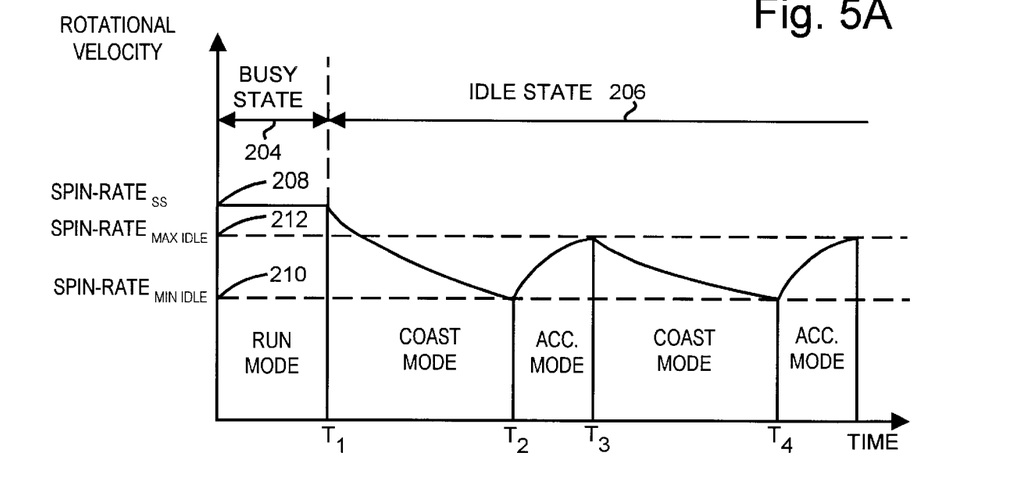
FIG. 5A is a timing diagram plotting spindle motor spin-rate versus time to illustrate a power-saving idle operation according to an embodiment of the present invention.

FIG. 5A illustrates, in timing diagram form, one embodiment of the present invention for operation of idle speed controller 202. In FIG. 5A, the spin-rate of the spindle motor 50 is plotted versus time. Servo Microprocessor 96 fuinctioning as idle speed controller 202 reads the speed-indicating signal on line 144 and uses the spin-rate value represented in the speed-indicating signal for determining when to coast or accelerate spindle motor 50 to reduce the power consumed by power MOSFETs 128 and spindle motor 50.

In FIG. 5A, a busy state is indicated at 204 to illustrate when disk drive 30 is performing read or write operations. In FIG. 5A, during the busy state 204, servo microprocessor 96 functioning as speed controller 116 reads the speed-indicating signal on line 144 and uses the spin-rate value represented in the speed-indicating signal for controlling the spin-rate of spindle motor 50 via servo controller 98 to maintain a substantially constant spin-rate of disk 50 (spin-rate$_{steady-state}$), indicated at 208.

In FIG. 5A, the idle state is indicated at 206. At time $T_1$, interface processor 84 detects an idle state condition in disk drive 30 and causes servo microprocessor 96 to operate as idle speed controller 202. When the idle state 206 is entered at time $T_1$, servo microprocessor 96 functioning at idle speed controller 202 reads the speed-indicating signal on line 144 and uses the spin-rate value represented in the speed-indicating signal for controlling the spin-rate of spindle motor 50 by causing spindle motor 50 to coast via servo controller 98 and spindle motor driver 103 to a minimum idle spin-rate (spin-rate$_{Min-Idle}$), indicated at 210. The minimum idle spin-rate 210 is reached at time $T_2$.

At time $T_2$, servo microprocessor 96 functioning as idle speed controller 202 reads a speed-indicating signal on line 144 and uses the spin-rate value represented in the speed-indicating signal for accelerating the spin-rate of spindle 50 by providing a digital signal equal in magnitude to the command current in the busy state or run mode to DAC 94 of servo controller 98, which provides the analog signal on line 91 to PWM controller 124 which controls the current flowing through switched on power MOSFETs 128 during run operations based on differences between the speed reference and the value of the speed indicating signal on line 144. Similar to normal busy state run operations, commutation state sequencer 122 operates to accelerate the spin-rate of spindle motor 50 to a maximum idle spin-rate (spin-rate$_{Max-Idle}$), indicated at 212, by sequencing through commutation states to control which power MOSFETs 128 are switched on and which are switched off so that a substantially positive torque will be generated for rotor 105 of spindle motor 50. The speed controller servo loop can be, but is suitably not used to accelerate spindle motor 50 back up to the maximum idle spin-rate (spin-rate$_{Max-Idle}$) 212. Suitably, the maximum idle spin-rate is approximately equal to the steady-state spin-rate 208. Alternatively, the maximum idle spin-rate is less than the steady-state spin-rate as illustrated in FIG. 5A.

The spin-rate of disk 50 reaches maximum idle spin-rate 212 at time $T_3$ and servo microprocessor 96 functioning as idle speed controller 202 again causes the spindle motor to coast via servo controller 98 and spindle motor driver 103. At time $T_4$, the minimum idle spin-rate 210 is again reached and servo microprocessor 96 functioning as idle speed controller 202 causes servo controller 98 to again control spindle motor driver 103 to switch current through power MOSFETs 128 in a manner to accelerate the spin-rate of spindle motor 50 by applying positive torque to the rotor 105 of spindle motor 50.

During a coast operation of disk drive 30, all of the power MOSFETs 128 are off so that windings 104 of spindle motor 50 are floating and no current flows through windings 104 and substantially only frictional forces slow down spindle motor 50. Turning off power MOSFETs 128 to coast spindle motor 50 causes spindle assembly 48 to coast on its inertial mass without using any power. During the coast operation, the servo speed controller loop does not respond as in normal run mode to the speed reference signal to control the speed of spindle motor 50. Instead idle speed controller 202 permits spindle motor 50 to coast down to the minimum idle spin-rate (spin-rate$_{Min-Idle}$) 210.

Figure 5B:
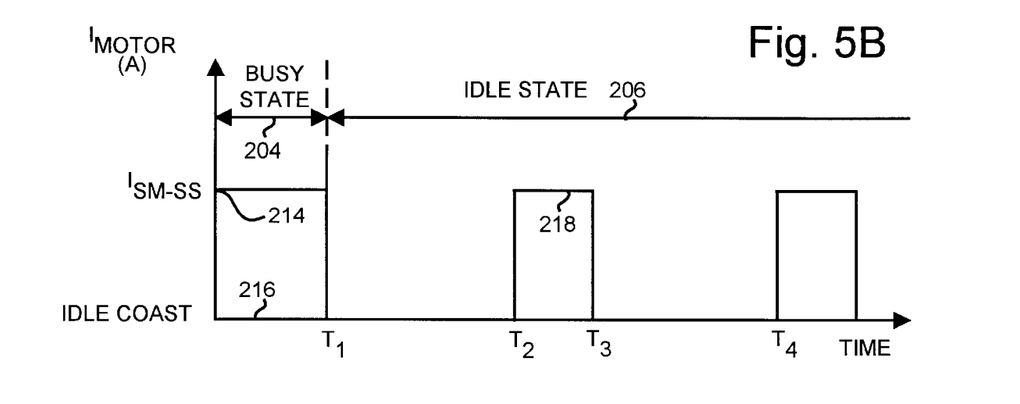
FIG. 5B is a timing diagram plotting spindle motor current versus time to further illustrate the power-saving idle operation of FIG. 5A.
Figure 5C:
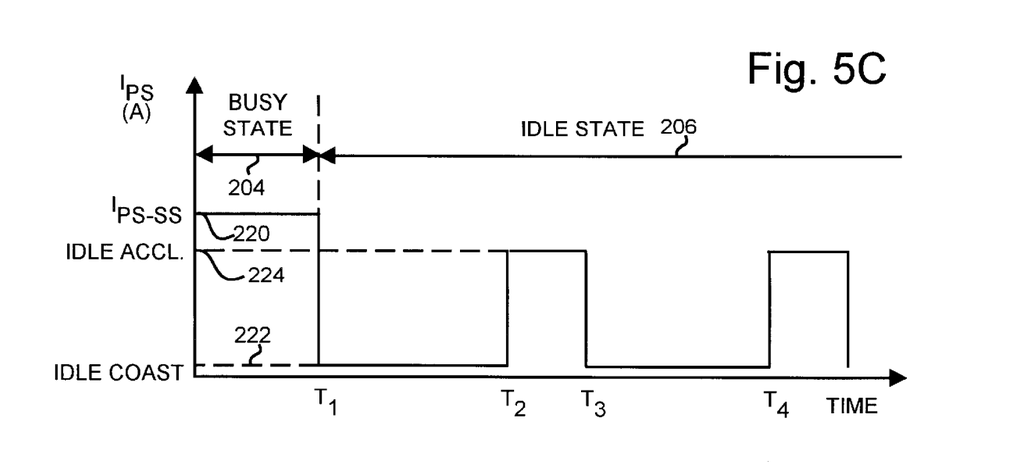
FIG. 5C is a timing diagram plotting power supply current versus time to further illustrate the power-saving idle operation of FIG. 5A.

FIGS. 5B and 5C further illustrate, in timing diagram form, the embodiment for operation of idle speed controller 202 illustrated in FIG. 5A. In FIG. 5B, the winding current 98 in spindle motor 50 is plotted versus time. In FIG. 5C, the power supply current to be utilized by spindle motor 50 is plotted versus time During the busy state 204, when spindle motor 50 is operating to maintain a substantially constant spin rate of disk 50 (i.e., spin-rate$_{steady-state}$), the spindle motor current is at a steady-state level ($I_{sm-ss}$) as indicated at 214 in FIG. 5B and the current drawn from the power supply is at a steady-state level ($I_{ps-sm}$) indicated at 220 in FIG. 5C. When the idle state 206 is entered at time $T_1$, servo microprocessor 96 functioning at idle speed controller 202 causes spindle motor 50 to coast via servo controller 98 and spindle motor driver 103 to the minimum idle spin-rate by switching off all power MOSFETs 128. Thus, as indicated at 216 in FIG. 5B, the spindle motor idle coast current ($I_{sm-idle-coast}$) is 0. In FIG. 5C, the power supply idle coast current ($I_{ps-idle-coast}$) is indicated at 222 to be slightly above 0 because as described below with reference to FIG. 6 a bulk capacitor 230 (shown in FIG. 6) is charged during the idle state coast operation.

At time $T_2$, similar to normal busy state run operations, commutation state sequencer 122 operates to accelerate the spin-rate of spindle motor 50 to the maximum idle spin-rate (spin-rate$_{max-idle}$) by sequencing through commutation states to control which power MOSFETs 128 are switched on and which are switched off so that a substantially positive torque will be generated on rotor 105 of spindle motor 50. During this acceleration operation of idle state 206, the spindle motor current rises back to the steady-state $I_{sm-ss}$ level as indicated at 218 in FIG. 5B. Nevertheless, the current supplied from the power supply does not rise to the steady-state level, as indicated at 224 in FIG. 5C. As described below with reference to FIG. 6, during the acceleration mode of idle state 206, a significant amount of the current switched through spindle motor driver 103 to windings 104 of spindle motor 50 is suitably drawn from bulk capacitor 230 (shown in FIG. 6) which reduces the amount of power drawn from the 12-volt power supply.

Figure 6:
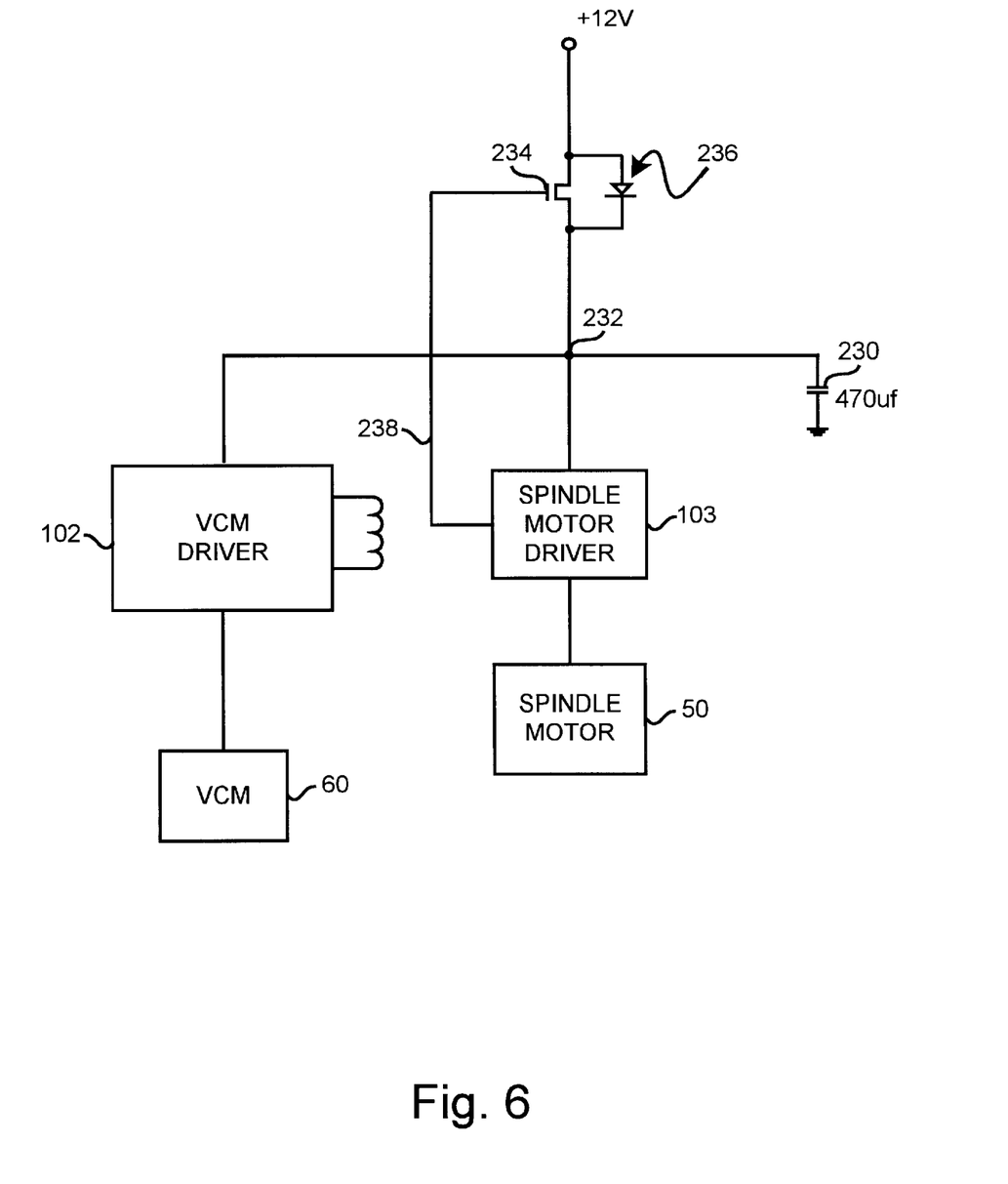
FIG. 6 is a schematic and block diagram of a portion of one embodiment of the hard disk drive of FIG. 1 that includes a capacitor that is charged during a coast mode of an idle state and provides current to the spindle motor during an acceleration mode of the idle state.

FIG. 6 illustrates a bulk capacitor 230 which has a suitable value of 470 $\mu$F. Bulk capacitor 230 is coupled between ground and a node 232. Node 232 is coupled to VCM driver 102 and spindle motor driver 103. In addition, node 232 is coupled to the 12-volt power supply through a MOSFET 234 and a diode 236. A control signal from spindle motor driver 103 is provided on a line 238 to the gate of MOSFET 234. The control signal on line 238 is controlled via servo microprocessor 96 and servo controller 98 so that when power to disk drive 30 is turned on, MOSFET 234 is off to prevent the +12-volt supply from being provided to node 232. After an interval of time passes, which permits servo microprocessor 96, interface processor 84, and other control circuitry in disk drive 30, such as servo controller 98, to initialize, the control signal on line 238 changes states via servo microprocessor 96, servo controller 98, and spindle motor drivers 103 to cause MOSFET 234 to turn on to couple the +12-volt supply to node 232. Bulk capacitor 230 is suitably a filtering capacitor used to minimize instantaneous current drawn on the 12-volt power supply to reduce ripple current during normal operations. During the coast mode of idle state 206 according to an embodiment of the present invention, bulk capacitor 230 is charged. Consequently, during the acceleration mode of idle state 206, a significant amount of the current switched through spindle motor driver 103 to windings 104 of spindle motor 50 is drawn from bulk capacitor 230 which minimizes the amount of power drawn from the 12-volt power supply by spindle motor 50 and power MOSFETs 128 to accelerate spindle assembly 48 up to the maximum idle spin-rate 212.

Figure 7:
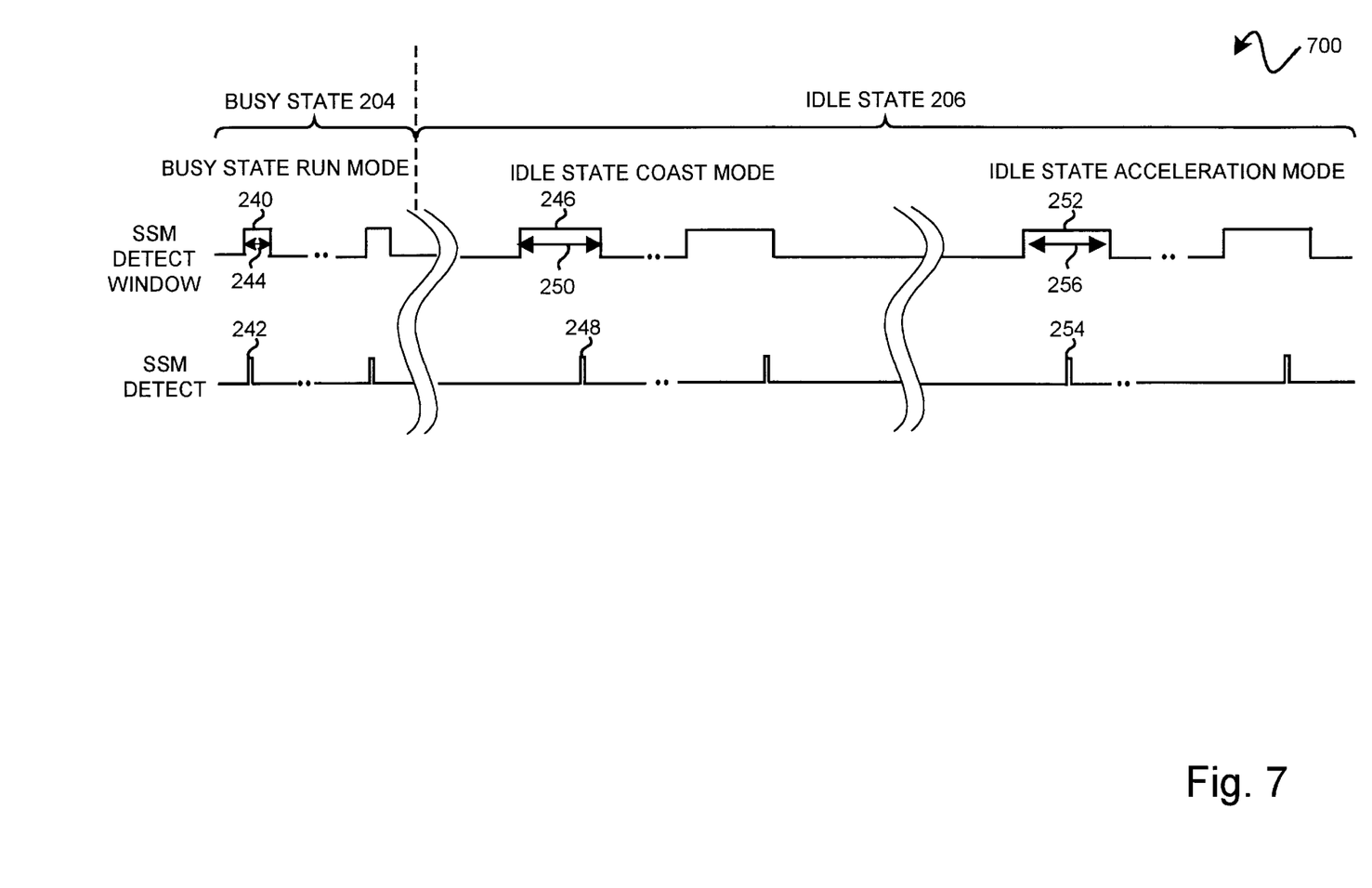
FIG. 7 is a timing diagram illustrating the detection of a servo sync mark from a servo sector in a busy state run mode and in idle state coast and acceleration modes during the power-saving idle operation of FIG. 5.

To maintain track following while spindle motor 50 is in the coast mode of idle state 206, servo timer 101 of servo controller 98 is suitably programmed in a wide window mode to continue detecting the SSM field 176 and to continue demodulating servo burst 182–188 servo information. Referring to FIG. 7, a representative timing diagram 700 illustrates the widening of the SSM detect window for the coast and acceleration modes of the idle state 206. During the busy state 204 (run mode), the SSM detect window is generated by servo timer 101 in servo controller 98, as indicated at 240 7. The detection of the SSM field 176 during the busy state 204 is indicated at 242. The time interval width of the SSM detect window 240 during the busy state is indicated by arrows 244. Suitably, the time interval width 244 of the SSM detect window 240 during the busy mode is approximately 0.4 microseconds.

Suitably, during the coast mode of idle state 206, the SSM detect window is widened to approximately four times the width of the SSM detect window during the normal busy state 206 (run mode) as indicated by a SSM detect window 246 having an exemplary time interval width of approximately 1.5 microseconds, as indicated by arrows 250. The detection of the SSM field 176 during the coast mode of idle state 206 is indicated at 248. As illustrated in FIG. 7, the SSM detection is made towards the end of the SSM detect window 246 which represents that during the coast mode of idle state 206 spindle motor 50 is decelerating the spin-rate of the disk and this can result in SSM detection being made later than normal.

During the acceleration mode of idle state 206, a SSM detect window 252 having a time interval width 256 is used for servo timing. The time interval width 256 can be, for example, equal to the time interval width 244 for the busy state 204 or the wider time interval width 250 for the coast mode of idle state 206 as illustrated in FIG. 7, or somewhere in between depending on servo circuitry parameters. The detection of the SSM field 176 is indicated at 254 during the acceleration mode of idle state 206. As illustrated in FIG. 7, a SSM detect is made during the acceleration mode of idle state 206 towards the center of the SSM detect window to indicate that during the acceleration mode of idle state 206, spindle motor 50 is accelerating the spin-rate of the disk and this can result in SSM detection being made earlier than normal.

Typically, servo timer 101 in servo controller 98 is clocked based on the PLO field 174 frequency rate during the reading of servo sector 158 and is clocked with a crystal oscillator based on the recording zone during the reading and writing of data from and to data region 156. In one embodiment, during the idle state 206, servo timer 101 of servo controller 98 is clocked based on the PLO field 174 frequency rate during the reading of servo sectors 158 and the clock rate is held while transducer head 64 passes over data regions 156. In this way, the servo system is forced to be constantly in sync with the spin-rate of the disk to facilitate track following during the idle state 204. In addition, as to recovering to the steady-state spin-rate 208, because the servo system is constantly in sync with the disk spin-rate, even at lower spin-rates than the steady-state spin-rate 208, read operations can be performed immediately after the idle state 206. However, write operations are preferably performed at the steady-state spin-rate 208. The instantaneous spin-rate during the coast mode of idle state 206 is governed by the following Equation IV:

$$\omega(t) = \omega o * (e^{-(kf*t/j)}) \qquad \text{Equation IV}$$

where:
- $\omega(t)$ is the instantaneous rotational velocity or spin-rate in (rad/sec);
- $\omega o$ is the steady state rotational velocity or spin-rate in (rad/sec);
- Kf is the viscosity factor in (Kg-M$^2$/sec); and
- J is the Inertia of the Load in (Kg-M$^2$).

The amount of speed drift during the coast mode is small due to the large time constant ($T_{coast}$) of the spindle motor system during the coast mode. $T_{coast}$ is given by the following Equation V:

$$T_{coast} = J/KF \qquad \text{Equation V}$$

where:

$T_{coast}$ is equal to the time the spindle motor takes to coast from the steady state spin-rate to 32% of steady-state spin-rate.

An example $T_{coast}$ according to Equation V above for values of J=0.0002 Kg-M² and Kf=0.00001 K-M²/seconds, is $T_{coast}$=20 seconds. It would take approximately 1 percent of $T_{coast}$ for the spin-rate of spindle motor 50 to drift down by 1 percent, or $T_{coast}$=1% of $T_{coast}$ (e.g., example $T_{coast}$=0.2 seconds, where example $T_{coast}$=20 seconds). The example $T_{coast}$=0.2 seconds is equal to approximately 33.33 revolutions of an example spindle motor 50 operating at a 10,000 RPM spin-rate. This follows an approximate linear relationship, for example, it would take approximately 5 percent of $T_{coast}$ for the spin-rate of spindle motor 50 to drift down by 5 percent, or $T_{coast}$=5% of $T_{coast}$ (e.g., example $T_{coast}$=1.0 seconds, where example $T_{coast}$=20 seconds).

The instantaneous spin-rate during the acceleration mode of the idle state 206 is governed by the following Equation VI.

$$\omega(t) = \omega_0 (1 - e^{-(t/tow_m)}) \quad \text{Equation VI}$$

where:

$\omega_0$ is the steady-state rotational velocity or spin-rate in (rad/sec);

$tow_m = R_t * J/Kt^2$ or the mechanical time constant of the spindle motor;

$R_t = R_m + R_{MOSFET}$ or the total resistance of the spindle motor and wire connections between the spindle motor and the power MOSFETs and the power MOSFETs that are turned on for controlling current $I_m$ flowing through the spindle motor; and Kt is the torque constant of the spindle motor.

The mechanical time constant ($tow_m$) is an order of magnitude faster for the acceleration mode of idle state 206 as compared to $T_{coast}$ for the coast mode of idle state 206 (i.e., $tow_m$ is equal to approximately two seconds for the acceleration mode and $T_{coast}$ is equal to approximately 20 seconds for the coast mode). For example, the spin-rate returns to the steady-state spin-rate 208 in approximately 0.02 seconds where example $T_{coast}$ is equal to 0.2 seconds (i.e., 1% of example $T_{coast}$=20 seconds). As a result, the "on" duty cycle of power source modulation is a small percentage. Because of the small percentage "on" duty cycle of power source modulation and because a significant amount of the energy used to spin spindle motor 50 back to the maximum idle spin-rate 212 comes from bulk capacitor 230, significantly less current is drawn by power MOSFETs 128 and spindle motor 50 during the power source modulation idle state operation according to an embodiment of the present invention as compared to the busy state 206 (run mode operation). As a result, significantly less power is consumed by disk drive 30 during the idle state 206. In addition, if track following is maintained as described above, recovery time to perform read and write operations is minimal. In fact, as explained above, it is even possible to resume read operations at lower spin-rates as long as the track following servo system is constantly in sync with the spin-rate of the disk.

The amount of power savings in disk drive 30 depends on the "on" duty cycle for the power source modulation to the spindle motor. For example, there is a potential power savings of at least 50 percent. In one alternative embodiment, instead of basing the cyclical operation of switching between coast and acceleration modes on spin-rate, a selected time interval is used to switch from coast mode to accelerate mode. For example, one embodiment employs a 50 percent coast time interval and a 50 percent accelerate (i.e., run) time interval.

I claim:

1. A disk drive comprising:

a disk including a recording surface having a plurality of data tracks, each data track having servo sectors and data regions disposed between the servo sectors, the servo sectors including servo information;

transducer means for writing and reading from the data regions and reading servo information from the servo sectors;

a spindle motor coupled to the disk to rotate the disk;

a spindle motor driver for selectively providing current to the spindle motor;

track-following control means being responsive to the servo information for causing the transducer means to remain on track; and programmable means for performing a power-saving idle operation of causing the spindle motor driver to sequentially (1) provide no current to the spindle motor for at least one disk revolution and (2) provide current to the spindle motor for at least one disk revolution, the power-saving idle operation being performed while the track-following control means causes the transducer means to remain on track for multiple disk revolutions.

2. The disk drive of claim 1 wherein the spindle motor rotates the disk at a variable spin-rate and the disk drive further comprises:

means for producing a speed-indicating signal representing the variable spin-rate of the disk; and wherein the programmable means reads the speed-indicating signal to determine the variable spin-rate of the disk and performs the operation of causing the spindle motor driver to sequentially (1) provide no current to the spindle motor until the variable spin-rate is approximately equal to a selected minimum spin-rate and (2) provide current to the spindle motor until the variable spin-rate is approximately equal to a selected maximum spin-rate.

3. The disk drive of claim 2 wherein the variable spin-rate of the disk is substantially at a selected target spin-rate when the transducer means writes data to the data regions and the selected maximum spin-rate is approximately equal to the selected target spin-rate.

4. The disk drive of claim 1 wherein the programmable means performs the operation of causing the spindle motor driver to sequentially (1) provide no current to the spindle motor for a first selected interval of time and (2) provide current to the spindle motor for a second selected interval of time.

5. The disk drive of claim 1 wherein the wherein the programmable means performs the operation of causing the spindle motor driver to sequentially (1) provide no current to the spindle motor to cause the spindle motor to coast for at least one disk revolution and (2) provide current to the spindle motor to increase the spin-rate of the disk for at least one disk revolution.

6. The disk drive of claim 1 wherein the spindle motor rotates the disk at a variable spin-rate and the disk drive further comprises:

means for indicating a busy state while the transducer means is writing data to or reading data from the data regions and for indicating an idle state while the transducer means is not writing data to or reading data from the data regions;

wherein the programmable means is responsive to the busy state to control the spindle motor driver to provide current to the spindle motor to maintain the variable spin-rate of the disk substantially at a busy target spin-rate; and wherein the programmable means is responsive to the idle state to control the spindle motor driver to sequentially (1) provide no current to the spindle motor for at least one disk revolution and (2) provide current to the spindle motor for at least one disk revolution to reduce power consumed by the disk drive during the idle state while maintaining the variable spin-rate of the disk above a selected minimum spin-rate.

7. The disk drive of claim 6 wherein the transducer means reads data from the data regions immediately after the idle state while the programmable means controls the spindle motor driver to increase the variable spin-rate to the busy target spin-rate.

8. The disk drive of claim 6 wherein the transducer means does not write data to the data regions after the idle state until the programmable means controls the spindle motor driver to increase the variable spin-rate to the busy target spin-rate.

9. The disk drive of claim 1 wherein the servo information includes a servo sync mark field and wherein the track following control means includes timing means for enabling a timing window for the transducer means to read and detect the servo sync mark field, wherein the timing means responds to the detection of a first servo sync mark field from a first servo sector of a target data track to enable a timing window for the transducer means to read and detect a second servo sync mark field from a second servo sector in the target data track.

10. The disk drive of claim 9 wherein the programmable means causes the timing means to increase the timing window to permit the transducer means to remain on track for multiple disk revolutions while causing the spindle motor driver to cyclically (1) provide no current to the spindle motor for at least one disk revolution and (2) provide current to the spindle motor for at least one disk revolution.

11. The disk drive of claim 9 wherein the servo information further includes phase lock oscillator information and the timing means enables the timing window based on the phase lock oscillator information.

12. The disk drive of claim 9 wherein the servo information further includes servo burst information and wherein the transducer means provides a sampled position error signal indicating off-track position and wherein the track following control means demodulates the sampled position error signal for causing the transducer means to remain on track.

13. A method of operating a disk drive comprising a disk including a recording surface having a plurality of data tracks, each data track having servo sectors and data regions disposed between the servo sectors, the servo sectors including servo information, the disk drive including transducer means for writing and reading from the data regions and reading servo information from the servo sectors, a spindle motor coupled to the disk to rotate the disk, and a spindle motor driver for selectively providing current to the spindle motor, the method comprising the steps of:

(a) maintaining the transducer means on track for multiple disk revolutions; and (b) while performing step a, sequentially (1) providing no current to the spindle motor for at least one disk revolution and (2) providing current to the spindle motor for at least one disk revolution.

14. The method of claim 13 wherein the spindle motor rotates the disk at a variable spin-rate and the method further comprises the steps of:

producing a speed-indicating signal representing the variable spin-rate of the disk; and cyclically reading the speed-indicating signal to determine the variable spin-rate of the disk; and in step b, sequentially (1) providing no current to the spindle motor until the variable spin-rate is approximately equal to a selected minimum spin-rate and (2) providing current to the spindle motor until the variable spin-rate is approximately equal to a selected maximum spin-rate.

15. The method of claim 14 wherein the variable spin-rate of the disk is substantially at a selected target spin-rate when the transducer means writes data to the data regions and the selected maximum spin-rate is approximately equal to the selected target spin-rate.

16. The method of claim 13 wherein step b comprises sequentially (1) supplying no current to the spindle motor for a first selected interval of time and (2) supplying current to the spindle motor for a second selected interval of time.

17. The method of claim 13 wherein step b comprises sequentially (1) providing no current to the spindle motor to cause the spindle motor to coast for at least one disk revolution and (2) providing current to the spindle motor to increase the spin-rate of the disk for at least one disk revolution.

18. The method of claim 13 wherein the spindle motor rotates the disk at a variable spin-rate and the method further comprises the steps of:

indicating a busy state while the transducer means is writing data to or reading data from the data regions;

indicating an idle state while the transducer means is not writing data to or reading data from the data regions;

responding to the busy state to control the spindle motor driver to provide current to the spindle motor to maintain the variable spin-rate of the disk substantially at a busy target spin-rate; and responding to the idle state to control the spindle motor driver to sequentially (1) provide no current to the spindle motor for at least one disk revolution and (2) provide current to the spindle motor for at least one disk revolution to reduce power consumed by the disk drive during the idle state while maintaining the variable spin-rate of the disk above a selected minimum spin-rate.

19. The method of claim 18 further comprising the step of:

increasing the variable spin-rate to the busy target spin-rate while the transducer means reads data from the data regions immediately after the idle state.

20. The method of claim 18 further comprising the step of:

increasing the variable spin-rate to the busy target spin-rate after the idle state prior to the transducer means writing data to the data regions.

21. The method of claim 13 wherein the servo information includes a servo sync mark field and wherein step a comprises enabling a timing window for the transducer means to read and detect the servo sync mark field, wherein the enabling step includes responding to the detection of a first servo sync mark field from a first servo sector of a target data track to enable a timing window for the transducer means to read and detect a second servo sync mark field from a second servo sector in the target data track.

22. The method of claim 21 wherein step a further comprises increasing the timing window to permit the transducer means to remain on track for multiple disk revolutions while performing step b.

23. The method of claim 21 wherein the servo information further includes phase lock oscillator information and wherein the enabling step includes enabling the timing window based on the phase lock oscillator information.

24. The method of claim 21 wherein the servo information further includes servo burst information and the transducer means provides a sampled position error sig indicating off-track position, and wherein step a further comprises demodulating the sampled position error signal for maintaining the transducer means on track.

25. A disk drive comprising:

a disk including a recording surface having a plurality of data tracks, each data track having servo sectors and data regions disposed between the servo sectors, the servo sectors including servo information;

transducer means for writing and reading from the data regions and reading servo information from the servo sectors;

a spindle motor having a plurality of windings, the spindle motor coupled to the disk to rotate the disk;

a spindle motor driver having switching elements coupled to the plurality of windings for selectively providing current to the spindle motor;

track-following control means being responsive to the servo information for causing the transducer means to remain on track; and programmable means for performing a power-saving idle operation of causing the spindle motor driver to sequentially (1) turn off all of the switching elements so that no current is provided to the spindle motor and (2) turn on selected ones of the switching elements to provide current to the spindle motor, the power-saving idle operation being performed while the track-following control means causes the transducer means to remain on track for multiple disk revolutions.

\* \* \* \* \*